UNITED STATES PATENT OFFICE.

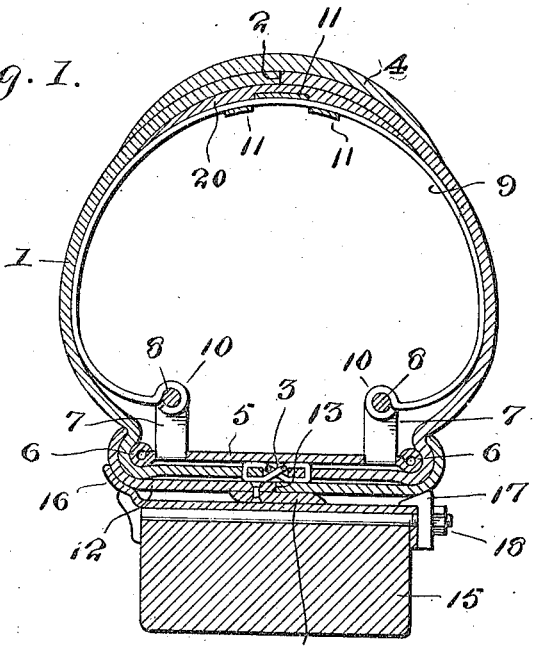
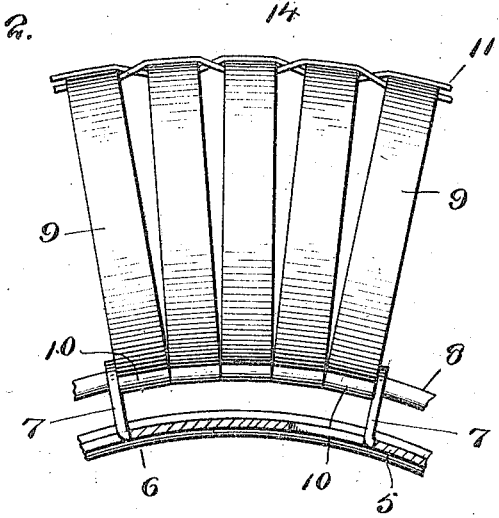

HERBERT O. TIBBITTS, OF CLEVELAND, OHIO.

RESILIENT TIRE.

1,232,998. Specification of Letters Patent. Patented July 10, 1917.

Application filed March 21, 1916. Serial No. 85,709.

*To all whom it may concern:*

Be it known that I, HERBERT O. TIBBITTS, a citizen of the United States, residing at Cleveland, in the county of Cuyahoga and State of Ohio, have invented new and useful Improvements in Resilient Tires, of which the following is a specification.

This invention relates to resilient tires, the object in view being to produce a tire having practically the same resiliency as a pneumatic tire but requiring no inflation nor the use of compressed air to hold the tire in its expanded condition, the tire of this invention embodying in combination with an outer flexible casing, a novel arrangement of casing distending springs and mounting and sustaining means therefor and for the outer casing whereby the resilient tire above referred to is obtained in a practical and also economical way.

With the above and other objects in view, the invention consists in the novel construction, combination and arrangement of parts, as herein described, illustrated and claimed.

In the accompanying drawings:—

Figure 1 is a cross section through a tire embodying the present invention showing the relation thereof to a demountable rim and wheel felly.

Fig. 2 is a fragmentary side elevation of the tire partly in section omitting the outer casing.

Referring to the drawings, 1 designates an outer casing which may be composed of leather, rubber or any other flexible material, the same being preferably formed in two equal and similar sections which abut together at the tread along the line 2 and the inner margins of which are connected and drawn tightly together around the base band hereinafter referred to by lacing indicated at 3. 4 designates a tread member which is also composed of flexible material such as leather or rubber and which is secured by cementing, vulcanizing or any other approved manner to the tread portions of the sections of the outer casing 1, and in overlapping relation to the joint 2.

5 designates a base band or hoop of metal annular in form and preferably flat or substantially so in cross section as shown in Fig. 1, the opposite side margins of the band 5 being rolled or curled as shown at 6 to form rounded edges or beads which will not chafe and injure the outer casing 1, the outer casing passing around said beaded or rolled portions of the base band as shown in Fig. 1. The band 5 is properly punched and formed with struck-up hangers 7 which extend outwardly from the main body of the band and substantially radial to the center of the wheel, there being two rows of such outwardly struck hangers as shown in Fig. 1, the hangers forming supporting means for annular stringers 8 which encircle the hangers 7, the latter being formed with sockets or openings to receive the stringers 8, the latter being thereby sustained in fixed relation to the band 5. Between the hangers, the stringers 8, which are preferably formed of spring metal, have a resiliency which assists the springs hereinafter referred to in providing the necessary resiliency for the tire as a whole. Furthermore, the band 5 itself is of spring material such as steel and contributes its part toward the resiliency of the complete tire, said band being supported upon the inner portions of the flexible outer casing 1.

Mounted upon and supported by the stringers 8 is a circular series of arched or C-shaped springs 9 each conforming throughout the greater portion of its length to the curvature of the inner wall of the outer casing 1. Each of the springs is formed at its extremities with eyes 10 which embrace and receive the oppositely located stringers 8, the springs thus being anchored to the stringers. While the inner ends of the springs are arranged in close or touching relation to each other as indicated in Fig. 2, the outer tread portions of the springs are spaced apart but are connected in such a way as to prevent any excessive degree of relative movement in the direction of length of the tread of the tire by means of an odd number of strips 11 of any suitable material, the same being preferably of spring steel flat and thin as indicated in Fig. 1 and being woven about the tread portions of the springs 9 in the manner illustrated in Fig. 2.

The structure above described is carried by a demountable rim 12 divided longitudinally as indicated at 13, one of the rim sections having fixedly attached thereto a joint closing strip 14 which overlaps the joint 13 and underlies the inner edge of the other section of the demountable and sectional rim. 15 designates the felly of a wheel, 16 the ordinary fixed rim secured to the felly 15, 17 the rim-holding lugs for the demountable rim, and 18 the lug-retaining bolts.

From the foregoing description, taken in connection with the accompanying drawings, it will be understood that the flexible outer casing 1 is supported in its expanded condition by means of the springs 9, the latter being in turn resiliently supported by the annular stringers 8 sustained in spaced relation to the base band 5 by means of the outwardly struck hangers 7, the space afforded by the hangers 7 allowing for the necessary bending action of the springs 9 to allow for the compression of the tire at the point of impact. By reason of the particular manner of and means for mounting and sustaining the springs 9 in place, considerable latitude is permitted in the flexure of said springs to accommodate the flexure of the outer casing when subjected to excessive loads or shocks.

The advantage resulting in the use of an odd number of spring bands 11, three of such bands being shown and being of the endless type, resides in the fact that all of the C-shaped springs 9 are enabled to give the same support to the outer casing of the tire. It is also preferred to make the central strip 11 of considerably greater width than the remaining strips 11 disposed at opposite sides thereof. Furthermore, a protecting annular band 20 of leather or analogous flexible material is interposed between the springs 9, the bands 11 and the tread portion of the outer casing thereby preventing the bands 11 from abrading, chafing and otherwise injuring the tire casing proper. As shown in Fig. 1, the side marginal portions of the protecting strip 20 are chamfered or brought to feather edges so as to preserve the rotundity of the tread portion of the tire. In view of the fact that the hoops or bands 11 are composed of spring steel or the like, and are also endless, they form an efficient resilient support not only for the tread portion of the tire but the springs 9 themselves in that the springs 9 are thereby adapted to mutually brace each other and enable the load to be distributed on a number of such springs lying within the zone upon which the load is directly imposed.

Having thus described my invention, I claim:—

1. A resilient tire comprising an outer casing, an annular unattached base band included within and surrounded and inclosed by said casing, said base band serving as means for shaping the base of the tire to conform to a tire-carrying rim, said base band also having outwardly struck hangers, annular stringers supported by said hangers in spaced relation to said band, and a circular series of arched springs lying in contact throughout the major portion of their lengths with the inner surface of the outer casing and provided with terminal eyes embracing and free to turn upon said annular stringers.

2. A resilient tire comprising an outer casing, an annular unattached base band included within and surrounded and inclosed by said casing, said base band serving as means for shaping the base of the tire to conform to a tire-carrying rim, said base band also having outwardly struck hangers, annular stringers supported by said hangers in spaced relation to said band, and a circular series of arched springs lying in contact throughout the major portion of their lengths with the inner surface of the outer casing and provided with terminal eyes embracing and free to turn upon said annular stringers, the side marginal edges of said base band being formed with annular beads serving as means for clamping the adjacent portions of the outer casing against the flanges of a tire carrying rim.

In testimony whereof I affix my signature in presence of two witnesses.

HERBERT O. TIBBITTS.

Witnesses:
E. P. DOWLING,
RICHARD J. MORIARTY.

Copies of this patent may be obtained for five cents each, by addressing the "Commissioner of Patents, Washington, D. C."